Figure 1:
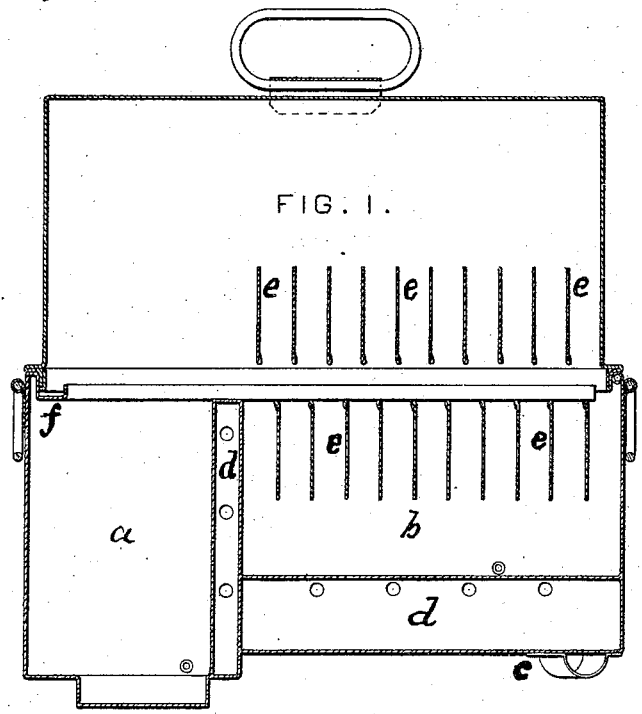

T. L. LYNCH.
DOMESTIC DISTILLING APPARATUS.

No. 183,268.  Patented Oct. 17, 1876.

WITNESSES:
Charles Thies
Wm Kembee Hall

Timothy L. Lynch.
INVENTOR.

UNITED STATES PATENT OFFICE.

TIMOTHY L. LYNCH, OF JERSEY CITY, NEW JERSEY.

IMPROVEMENT IN DOMESTIC DISTILLING APPARATUS.

Specification forming part of Letters Patent No. 183,268, dated October 17, 1876; application filed August 24, 1876.

*To all whom it may concern:*

Be it known that I, TIMOTHY L. LYNCH, of Jersey City, in the county of Hudson and State of New Jersey, have invented a new and useful Improvement in Domestic Distilling Apparatus, of which the following is a specification:

Spring-water is contaminated by the mineral and other matter which it takes up in solution in its passage through the earth, and rain-water washes out and brings down with it the floating impurities of the atmosphere through which it falls. It is believed that these impurities of ordinary drinking-water make it one of the most prolific sources of disease; and on the other hand it is known that water that is perfectly pure has proved a potent remedy in many diseases originating from disorders of the stomach.

The best filters may fail to separate the microscopic particles which may be the germs of disease, and they have no effect whatever upon the matter, poisonous or otherwise, that is held in chemical solution, and which passes readily through with the water.

Living germs may be killed by boiling the water, but their poisonous properties may not be destroyed, and, with those of the other impurities, they may not even be affected, except as they may have been concentrated by the evaporation. So, also, the impurities of the water from which ice has been formed may have been entangled in the crystalline structure, and combined with the ice, and retained with the water into which it is subsequently melted.

The water we use gathers poison from the earth and the clouds, and neither filters nor frost or heat, as ordinarily applied, will render it fit to drink.

The best, and in fact the only practical, way of obtaining water that may be absolutely pure is by distillation, or the condensation in a closed vessel of the vapor resulting from the application of heat.

The object of my invention is to obtain the water resulting from distillation and condensation of vapor by means of a cheap and effective apparatus, which may be used as a domestic utensil, and applied to an ordinary stove or range. To accomplish this object my said invention consists of a vessel divided into two parts, of which one is adapted to one of the fire-openings of a stove, and the other is raised out of contact with the stove, and separated from it and from the other compartment by air-chambers, which prevent the passage of the heat.

The utensil is intended as a fixture to the stove or range. The water is placed in the compartment to which the heat is applied, and the vapor that passes over is condensed in the other compartment, which is provided with extra condensing-surfaces for that purpose.

To enable others skilled in the arts to which it appertains to make and use my invention, I will proceed to describe its construction and operation with reference to the drawing.

Figure 2:
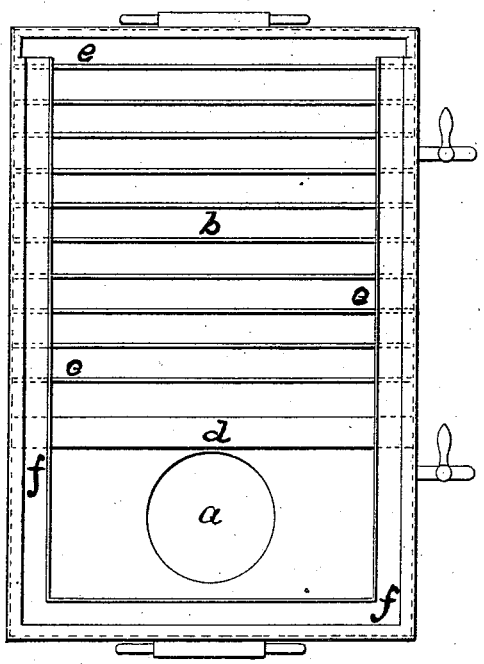
Figure 3:
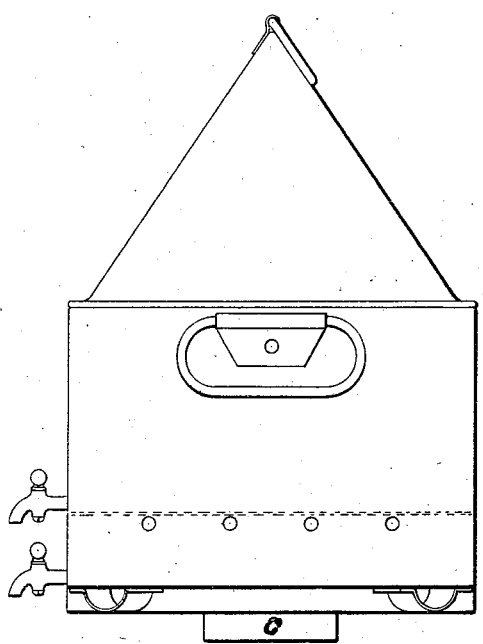

Figure 1 is a longitudinal section of the apparatus. Fig. 2 is a plan of the main portion with the cover removed, and Fig. 3 is an end view of the same.

The compartment $a$ fits one of the heat-openings of the stove, and the compartment $b$ rests upon the stove, and is supported by the legs $c$. The air-spaces $d$ separate the two compartments, and protect the bottom of the condensing-compartment, and they have holes in the sides, which open to the air to permit a free circulation. The interior of the condensing-compartment is fitted with the plates $e$ to facilitate condensation. The gutter $f$ around the rim catches the condensation from the cover and conducts it to the condensing-compartments.

The boiling water and the water of condensation may be drawn off by appropriate cocks, and the interior of the apparatus may be readily cleaned on the removal of the cover. The water-chamber may be fitted with a float that opens and closes a cock, to regulate automatically the supply of water.

The apparatus may be variously constructed with corrugated or other shaped surfaces, and arranged to suit different requirements, without departure from the principle of the invention, consisting of a vessel with two or more compartments, specially adapted for their different functions, and separated by air-chambers, in the manner described.

I claim as my invention and desire to secure by Letters Patent—

A domestic distilling apparatus, having a distilling-chamber, *a*, condensing-chamber *b*, condensing-plates *e*, and air-passages *d*, constructed as and for the purpose described.

TIMOTHY L. LYNCH.

Witnesses:
 CHARLES THIES,
 WM. KEMBLE HALL.